(12) United States Patent
Wu et al.

(10) Patent No.: US 9,886,521 B2
(45) Date of Patent: Feb. 6, 2018

(54) ADAPTIVE SAMPLING SCHEMES FOR CLUSTERING STREAMING GRAPHS

(71) Applicant: INTERNATIONAL BUSINESS MACHINES CORPORATION, Armonk, NY (US)

(72) Inventors: Kun-Lung Wu, Yorktown Heights, NY (US); Yinglong Xia, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/208,503

(22) Filed: Mar. 13, 2014

(65) Prior Publication Data
US 2015/0261886 A1    Sep. 17, 2015

(51) Int. Cl.
*G06F 17/30*    (2006.01)

(52) U.S. Cl.
CPC .. *G06F 17/30958* (2013.01); *G06F 17/30516* (2013.01); *G06F 17/30598* (2013.01)

(58) Field of Classification Search
CPC ......... G06F 17/30486; G06F 17/30598; G06F 17/30699; G06F 17/30702; G06F 17/3071; G06F 17/30713; G06F 17/30958; G06F 17/30961; G06F 17/30516
USPC ....... 707/708, 712, 715, 716, 726, 732, 733, 707/734, 736, 737, 738, 749, 755, 758, 707/767, 771, 784, 787, 795, 797, 798, 707/800, 802, 804, 805, 809, 999.006, 707/E17.046, E17.089, E17.092; 706/14
See application file for complete search history.

(56) References Cited

U.S. PATENT DOCUMENTS

| | | | |
|---|---|---|---|
| 6,028,608 A | 2/2000 | Jenkins | |
| 7,768,524 B2 | 8/2010 | Snyder et al. | |
| 8,037,284 B2 * | 10/2011 | Schenfeld | G06F 9/5061 709/231 |
| 8,139,843 B2 | 3/2012 | Kulkami et al. | |
| 8,392,381 B2 | 3/2013 | Kateb et al. | |
| 2012/0054129 A1 * | 3/2012 | Aggarwal | G06N 99/005 706/12 |
| 2012/0311581 A1 | 12/2012 | Balmin et al. | |
| 2013/0013601 A1 * | 1/2013 | Kabiljo | G06F 17/30861 707/737 |
| 2013/0024479 A1 * | 1/2013 | Gong | G06F 9/5066 707/798 |
| 2013/0055145 A1 * | 2/2013 | Antony | G05B 19/41875 715/781 |

(Continued)

OTHER PUBLICATIONS

Eldawy et al., "Clustering Streaming Graphs," Distributed Computing Systems (ICDCS), 2012 IEEE 32nd International Conference on.

(Continued)

*Primary Examiner* — Greta Robinson
(74) *Attorney, Agent, or Firm* — F. Chau & Associates, LLC

(57) ABSTRACT

A method for clustering vertices of streaming graphs includes: maintaining one or more clusters, assigning a random number to an incoming edge, computing a sampling threshold based on the current clusters, and adjusting the current clusters based on the random number and the sampling threshold.

21 Claims, 9 Drawing Sheets

(56) References Cited

U.S. PATENT DOCUMENTS

2013/0339357 A1* 12/2013 Eldawy ............. G06F 17/30961 707/737
2014/0172914 A1* 6/2014 Elnikety ........... G06F 17/30979 707/774
2014/0214834 A1* 7/2014 Ozonat ............. G06F 17/30598 707/737

OTHER PUBLICATIONS

Smith et al., "Application of adaptive cluster sampling to low-density populations of freshwater mussels," Environmental and Ecological Statistics 10, 7-15, 2003.
Gedik et al., "ASAP: An Adaptive Sampling Approach to Data Collection in Sensor Networks," IEEE Transactions on Parallel and Distributed Systems, vol. 18, No. 12, Dec. 2007.
Zhang, "A Survey on Streaming Algorithms for Massive Graphs," Managing and Mining Graph Data Advances in Database Systems vol. 40, 2010, pp. 393-420.
Al-Kateb et al., "Adaptive-size reservoir sampling over data streams." Scientific and Statistical Database Management, 2007. SSBDM'07. 19th International Conference on. IEEE, 2007.
Nam P. Nguyen et al., "Adaptive Algorithms for Detecting Community Structure in Dynamic Social Networks", presented as part of the main technical program at IEEE Infocom 2011; pp. 2282-2290.
Aggarwal et al., "A Framework for Clustering Evolving Data Streams", Proceedings of the 29th VLDB Conference, Berlin, Germany, 2003.
Albert Angel et al., "Dense Subgraph Maintenance under Streaming Edge Weight Updates for Real-time Story Identification", Aug. 27-31, 2012, Istanbul, Turkey, Proceedings of the VLDB Endowment, vol. 5, No. 6, pp. 574-585.
Yu-Ru Lin et al., "FacetNet:A Framework for Analyzing Communities and Their Evolutions in Dynamic Networks", WWW 2008, Apr. 21-25, 2008, Beijing, China, pp. 685-694.
Stanton et al., "Streaming Graph Partitioning for Large Distributed Graphs", KDD'12, Aug. 12-16, 2012, Beijing, Chinaf.
Mindi Yuan et al., "Efficient Processing of Streaming Graphs for Evolution-Aware Clustering", CIKM '13, Oct. 27-Nov. 1, 2013, San Francisco, CA.
Charu C. Aggarwal, et al., "On Clustering Graph Sreams", Proceedings of the 2010 SIAM International Conference on Data Mining, Apr. 29-May 1, 2010; pp. 478-489.
Pavlos S. Efraimidis, "Weighted Random Sampling over Data Streams", CoRR (2010).

* cited by examiner

| Add edge $e$ to the reservoir |
|---|

Input: partitions $\mathbb{C} = \{C_i\}$, edge $e = (u, v)$, threshold $p_t$
Output: updated partitions 1: $C_u = \begin{cases} C_i \in \mathbb{C} & \text{if } u \in C_i \\ \{u\} & otherwise \end{cases}$ $C_v = \begin{cases} C_i \in \mathbb{C} & \text{if } v \in C_i \\ \{v\} & otherwise \end{cases}$ 2: if $C_u == C_v$ then
3:    let $\Gamma_u^\ddagger = \Gamma_u^\ddagger \cup \{v\}$, $\Gamma_v^\ddagger = \Gamma_v^\ddagger \cup \{u\}$
4: else
5:    let $\Pi_{C_i, C_j} = \Pi_{C_i, C_j} \cup \{u, v\}$
6:    if $|\Pi_{C_i, C_j}| > \delta$ then
7:      Merge$(C_i, C_j, \Pi_{C_i, C_j})$
8:    end if
9: end if
10: save $(e, p_t)$ to a sort bucket for re-sampling

FIG. 4

| Delete edge $e$ from the reservoir |
|---|
| Input: partitions $\mathbb{C} = \{C_i\}$, edge $e = (u, v)$ |
| Output: updated partitions |
| 1: $\Pi_{C_i, C_j} = \Pi_{C_i, C_j} \setminus \{e\}$ |
| 2: if $u \in \Gamma_v^\dagger$ or $v \in \Gamma_u^\dagger$ then |
| 3:    Build_SpanTree$(u, v, C_u, C_v)$ |
| 4: else |
| 5:    $\Gamma_u^\ddagger = \Gamma_u^\ddagger \setminus \{u\}$, $\Gamma_v^\ddagger = \Gamma_v^\ddagger \setminus \{v\}$ |
| 6: end if |
| 7: delete $(e, p_t)$ from sorted buckets |

FIG. 5

| Merge partitions $C_i, C_j$ |
|---|
| 1: pick any $(u, v) \in \Pi_{C_i, C_j}$ |
| 2: let $\Gamma_u^\dagger = \Gamma_u^\dagger \cup \{v\}$, $\Gamma_v^\dagger = \Gamma_v^\dagger \cup \{u\}$ |
| 3: update owner partition info of $v$ as $C_i$ |
| 4: for all $(u', v') \in \Pi_{C_i, C_j} \setminus \{(u, v)\}$ do |
| 5:    $\Gamma_{u'}^\ddagger = \Gamma_{u'}^\ddagger \cup \{v'\}$, $\Gamma_{v'}^\ddagger = \Gamma_{v'}^\ddagger \cup \{u'\}$ |
| 6:    update owner partition info of $v'$ as $C_i$ |
| 7: end for |
| 8: update owner partition info of nodes in $C_j$ as $C_i$ |
| 9: delete $\Pi_{C_i, C_j}$ and $C_j$ |

FIG. 6

| Build Spanning Tree ($e = (u,v), C_u, C_v$) |
|---|
| Input: edge-to-delete $e = (u,v)$, partition $C \ni u, v$ |
| Output: $C_u, C_v$ |
| 1: $\Gamma_u^\dagger = \Gamma_u^\dagger \setminus \{(u,v)\}$ |
| 2: Let $C_u$ be the connected component included $u$ |
| 3: for all $u' \in C_u$ do |
| 4:   Update $\Gamma_{u'}^\ddagger$ and $\Gamma_{u'}^\dagger$ by traversing the partition |
| 5: end for |
| 6: if $|C_u| < |C|$ then |
| 7:   for all $v' \in C_v$ do |
| 8:     Update $\Gamma_{v'}^\ddagger$ and $\Gamma_{v'}^\dagger$ by traversing the partition |
| 9:   end for |
| 10: end if |

FIG. 7

| Clustering a streaming Graph |
|---|

Input: a streaming graph $G$, upper bound $B$
Output: a set of clusters $\mathbb{C} = \{C_i\}$
1: Initialize $\mathbb{C}$ at time $t_0$
2: for $t = t_0, t_1, \cdots$ do
3:     $(S_{add}, S_{del}) \leftarrow$ sliding window {Process edge deletions}
4:     for all $e$ in $S_{del}$ do
5:       if $\exists C_i \in \mathbb{C}$ s.t. $e \in C_i$ then
6:         Delete_edge($e$)
7:       end if
8:     end for {Process edge additions by adaptive sampling}
9:     for all $e$ in $S_{add}$ do
10:      $p_t = (1 - \alpha) + \alpha \left(1 - e^{-\mathcal{F}(\mathbb{C},B)}\right)$
11:      if $p_t > r \sim U[0,1]$ then
12:        Add_edge($e$)

{Re-sampling}
13:        Select $e' \in \cup C_i \; \forall C_i \in \mathbb{C}$ with $p_{t'} > p_t$
14:        $p^* = p_{t'}/p_t$
15:        if $p^* < r \sim U[0,1]$ then
16:          Delete_edge($e$)
17:        end if
18:      end if
19:    end for
20: end for

FIG. 8

ADAPTIVE SAMPLING SCHEMES FOR CLUSTERING STREAMING GRAPHS

GOVERNMENT RIGHTS STATEMENT

This invention was made with Government support under Contract No. W911NF-12-C-0028 awarded by the Defense Advanced Research Projects Agency (DARPA). The Government has certain rights in this invention.

BACKGROUND

1. Technical Field

The present disclosure relates to the stream processing, and more particularly to determining clusters from the processed streams.

2. Discussion of Related Art

As the world becomes more interconnected and instrumented, there is a deluge of data coming from various software and hardware sensors in the form of continuous streams. Examples can be found in several domains, such as financial markets, telecommunications, surveillance, manufacturing, healthcare, and social networks. In all of these domains, there is an increasing need to gather, process, and analyze these data streams to extract insights as well as to detect emerging patterns and outliers. More importantly, this analysis often needs to be performed in near real-time.

Streaming data can be represented by using a graph. For example, data that is streamed (output) from a source (e.g., a first user) to a destination (e.g., a second user) can be represented as an edge in the graph, and the source and destination can be respective nodes of the edge. A group of related nodes in the graph may be referred to as a cluster. Further, the clusters may represent particular relationships that can be used for marketing purposes. However, since new data is constantly being input, the graph can become quite complex and it can be difficult to determine the clusters, especially when the clusters change dynamically.

Accordingly, there is a need for methods and systems that can more efficiently analyze streaming graphs.

BRIEF SUMMARY

According to an exemplary embodiment of the invention, a method for clustering a streaming graph includes: maintaining one or more clusters, assigning a random number to an incoming edge, computing a sampling threshold based on the current clusters, and adjusting the current clusters based on the random number and the sampling threshold.

According to an exemplary embodiment of the invention, a system to manage clustering a streaming graph includes a memory storing a computer program and a data structure storing one or more clusters, and a processor configured to execute the program to adjust the clusters in response to an incoming edge by assigning a random number to the edge, computing a sampling threshold based on the current clusters, and adjusting the current clusters based on the random number and the sampling threshold.

According to an exemplary embodiment of the invention, a method for clustering a streaming graph includes: assigning a random number to an incoming edge, computing a sampling threshold based on existing clusters of the graph, inserting the incoming edge into the existing clusters if the random number is less than the sampling threshold, and discarding the incoming edge if the random number is not less than the sampling threshold.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 4 illustrates a procedure for adding an edge to a streaming graph according to an exemplary embodiment of the invention.

FIG. 5 illustrates a procedure for deleting an edge from a streaming graph according to an exemplary embodiment of the invention.

FIG. 6 illustrates a procedure for merging two partitions of a streaming graph according to an exemplary embodiment of the invention.

FIG. 7 illustrates a procedure for building a spanning tree associated with a partition of the graph according to an exemplary embodiment of the invention.

FIG. 8 illustrates a procedure for clustering a streaming graph according to an exemplary embodiment of the invention that uses the procedures of FIGS. 4-7.

DETAILED DESCRIPTION

Figure 1:
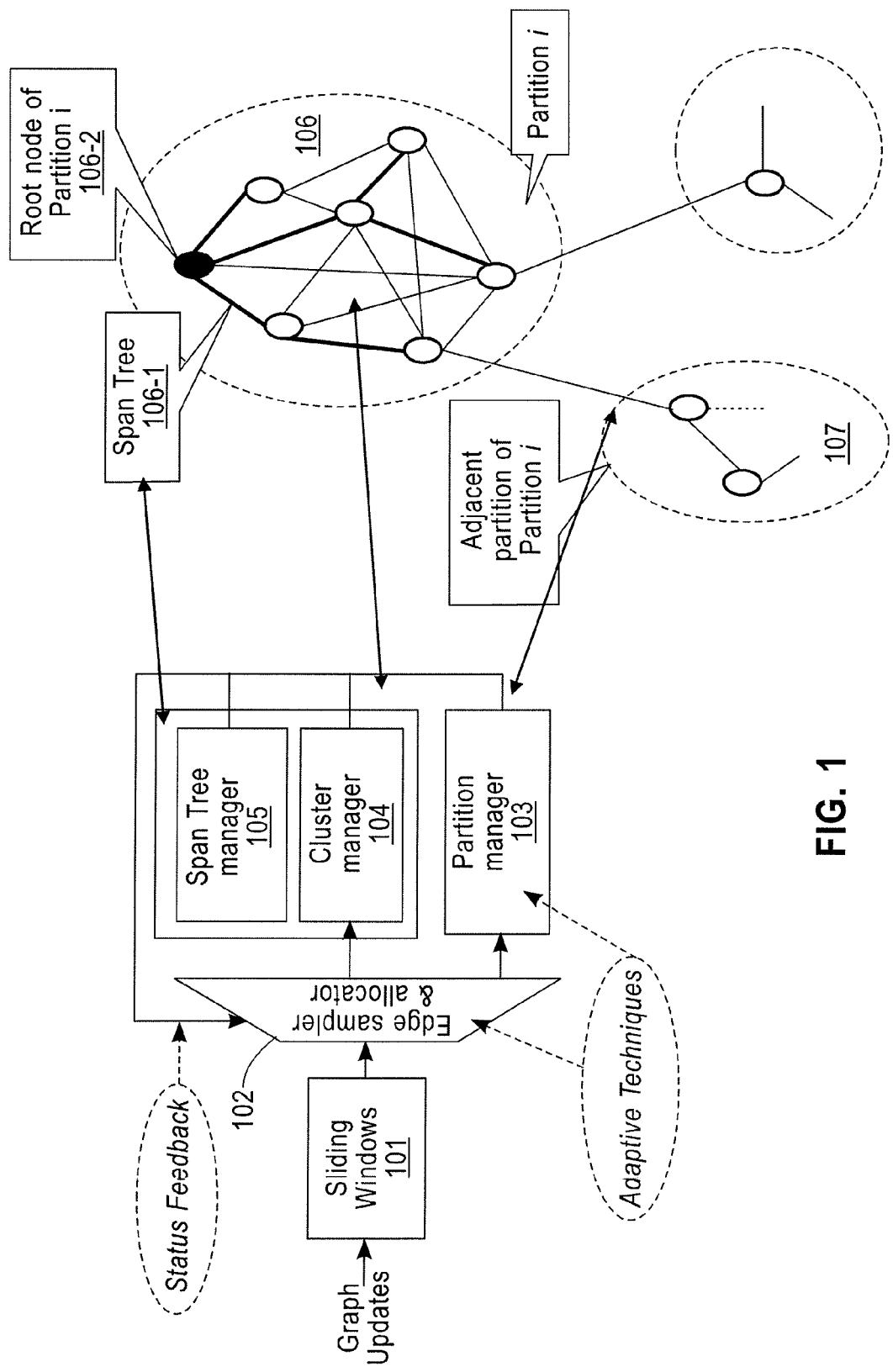
FIG. 1 illustrates the structure of a system for performing clustering according to an exemplary embodiment of the invention.

Embodiments of the present invention relates to methods and/or systems that can more efficiently analyze and cluster streaming graphs.

There is enormous interest in analyzing and understanding real-life events based on available social media data (e.g., TWITTER TWEETS, FACEBOOK messages and post, etc.). The relationships and interactions among data may be represented by a dynamic graph. Such a graph is as known as a streaming graph, since the graph update events such as edge insertions or deletions arrive dynamically in a streaming fashion. Clustering streaming graph events is fundamental to many social media analytics that try to understand the nature of, and the dynamic changes in, social interactions among groups of entities. For example, clustering streaming graph events can be a basic building block for finding all community members associated with an individual entity in real-time, which then can be used for targeted advertisements, or answering a question posted on a chat board if two entities are in the same community at the current moment based on selective topics of discussion. Clustering streaming graph events can also be used to provide real-time clustering of TWEETS based on mention/retweet relationships or memes. By clustering streaming tweets, in addition to viewing the content of a TWEET, a receiver of the TWEET can also view all the users who have mentioned/retweeted the TWEET.

There are several challenges in clustering streaming graphs. Because there might be a large volume of graph events within a short period of time, clustering streaming graph events may employ sampling. However, it is very difficult to decide a proper sampling threshold, especially if the clustering is highly dynamic. In addition, a graph may contain some giant clusters, which may need to be split into smaller ones so that each cluster can fit into a given data structure or computing node. Moreover, any information obtained using the current graph, such as the identified graph clusters, can quickly become stale due to the changing nature of the streaming graphs. So, in at least one embodiment of the invention, the clustering is performed incrementally with a bias towards more recent graph updates.

At least one exemplary embodiment of the invention applies self-adaptation to clustering streaming graphs based on the current input streaming data, which reduces or eliminates the dependence on prior knowledge about the data patterns. A user defined upper bound B is given, so that a cluster larger than the bound needs to be decomposed into a set of smaller clusters. It identifies a set of clusters with relatively dense intra-cluster connections and sparse inter-cluster connections from time evolving graphs by sampling a stream of graph updates using an adaptive sampling threshold.

Exemplary embodiments of the invention involve an adaptive approach for clustering streaming graphs. The embodiments may involve one or more of techniques such as a) an adaptive technique for streaming graph clustering, where the sampling threshold is adjusted automatically and adaptively to the input graph updates; b) a re-sampling technique for revising the accepted edges in the sampled graph; and c) a confidence accumulation method to robustly determine if two clusters should be merged.

For ease of understanding embodiments of the invention, an undirected streaming graph $G^t=(V^t, E^t)$ is considered at time t, where the vertices $V^t$ (connected to one another via edges $E^t$) are partitioned into a group of disjoint subsets or clusters, denoted by $C_1^t, C_2^t, \ldots, C_N^t$, such that $V^t = U_{i=1}^{N^t} C_i^t, C_i \cap C_j = \emptyset$ and the size of the clusters satisfy $|C_i^t| \leq B, \forall i$ where B is a constant value defining the size of the maximum allowed cluster. A real graph can have a giant natural cluster beyond the system capacity. Therefore, in at least one embodiment of the invention, such giant clusters are decomposed into a set of smaller cluster, each with size B (or a maximum cluster size). The size B may be application-specific (e.g., vary based on the application), and may vary based on the memory capacity of the system.

In an incremental clustering scheme, the clustering of graph $G^t$ is based on the partitioning results $C_1^{t-1}, C_2^{t-1}, \ldots, C_N^{t-1}t-1$ on graph $G^{t-1}$ at a prior time t−1. At t=0, the initial graph can be either empty or initialized to a static partitioner. For ease of understanding embodiments of the invention, it is assumed $\Pi_{c_i,c_j}^t = \{e=(u,v) \in E^t | u \in C_i^t, v \in C_j^t\}$ denotes the edge set between $C_i^t$ and $C_j^t$, $1 \leq i, j \leq N^t$, and $\Pi_{c_i,c_i}^t$ denotes the edge within a cluster. The clustering according to at least one embodiment of the invention can be described according to equation 1 as follows:

$$\frac{\sum 1 \leq i, j \leq N^t, i \neq j |\pi_{C_i,C_j}^t|}{\sum 1 \leq 1 \leq N^t |\pi_{C_i,C_i}|} \quad (1)$$

s.t.

$$|C_i^t| < B, V^t = \bigcup_{i=1}^{N^t} C_i^t$$

$$C_i^t \cap C_j^t = \emptyset, \forall i \neq j$$

where B is a constant determined by the capacity of a system. Since $\Sigma 1 \leq i, j \leq N^t, i \neq j |\pi_{c_i,c_j}^t| + \Sigma 1 \leq i \leq N^t |\pi_{c_i,c_i}| = |E^t|$, the above optimization is equivalent to a minimum cut and maybe referred to balanced graph partitioning. Further, it is assumed that there is a streaming window (e.g., 101 of FIG. 1) to constrain the part of the streaming graphs that are currently being clustered.

In reservoir sampling, a method is used to construct a subgraph H from a streaming graph G by adding edges from G to H with a probability p. Specifically, the method assigns a random weight $r \in (0,1)$ to each edge in G and adds only the edges with $r \leq p$ to H, where p is referred to as the sampling threshold. The sampled edges can expand a cluster (increase the size) as long as it is smaller than a given upper bound B; otherwise the edges are discarded. Since a cluster usually has dense internal edges, vertices in a cluster are likely to be in the same connected component in H. On the other hand, when interpartition edges among clusters (edges that connect two clusters) are sparse in G, these edges are less likely to remain in the resulting graphs. Thus, the connected components of H would be a reasonable approximation of the hidden clustering. Note that a node (vertex) in the graph can become isolated in H, if all inclined edges of that node are rejected when sampling.

A high sampling threshold p keeps many inter-cluster edges; while a low sampling threshold p results in many isolated nodes. It is extremely difficult to set a proper sampling threshold p, especially in the presence of dynamic changes. Further, without a proper sampling threshold p, the quality of clustering can vary widely and be difficult to control, depending on the streaming data. Accordingly, in at least one exemplary embodiment of the invention, an adaptive technique is used to adjust the sampling threshold p automatically based on the input data.

FIG. 1 illustrates the architecture of a system for clustering that adjusts the sampling threshold p according to an exemplary embodiment of the invention. As shown in FIG. 1, the incoming graph updates are fed into the sliding window 101, which defines the scope of data to be processed. The new incoming graph updates slide into the window 101 while the earlier ones slide out. The edge additions sliding out of the window 101 lead to the deletion of corresponding edges from the sampled graph, so that the recent changes in the underlying graphs can be captured properly.

According to the current status of the identified clusters (e.g., 106, 107), the sampler and edge allocator 102 adjusts the sampling threshold p for selecting new graph updates. The accepted graph updates are used to incrementally revise clusters (e.g., 106, 107). If the edge sampler and allocator 102 determines than a new incoming edge is to be inserted into an existing cluster (e.g., 107)), the edge sampler and allocator 102 passes the edge to the cluster manager 104 that maintains the intra-partition edges (e.g., the internal edges within a cluster). If the edge sampler and allocator 102 does not determine that the new incoming edge is to be inserted into an existing cluster, the edge sampler and allocator 102 passes the edge to the partition manager 103, which maintains the inter-partition edges. For example, if the new incoming edge is not to be inserted into an existing cluster, it is likely that the edge is an inter-cluster edge. The partition manager 103 maintains information about the edges between any two clusters and if they are sufficient to lead to the merge of two clusters.

The spanning tree manager 105 maintains a subset of the inter-partition edges that forms a spanning tree (e.g., 107-1) for each cluster (e.g., 107). A spanning tree is a selection of edges of a graph that forms a tree spanning every vertex. For example, as shown in FIG. 1, the spanning tree 107-1 does not include all edges of the cluster 107, and only includes the minimum number of edges that enables each vertex of the cluster to be connected to one another. The spanning tree manager 105 can be used to perform efficient query of the nodes in the same cluster as a given node. For example, the spanning tree manager 105 can be used to identify the nodes in the same cluster as a given node. The spanning tree manager 105 may be used in a procedure that deletes an edge according to an exemplary embodiment of the invention, which will be discussed in more detail below.

In an exemplary embodiment of the invention, the edge sampler and allocator 102 takes into account feedback from the partition manager 103, the cluster manager 104, and the spanning tree manager 105, to understand the current status of the clusters. In FIG. 1, the feedback information is illustrated by arrows emanating from the end of managers 103, 104, and 105 to the top of the edge sampler and allocator 102. In an exemplary embodiment, the feedback information is the number of current clusters and the number of nodes in each cluster. The feedback information is used by the edge sampler and allocator 102 for updating the sampling threshold. For example, in Equations (2) and (4), the number of a current cluster N is retrieved from the partition manager 103 and the sizes $|C_i|$ are read from the cluster manager 104 and the spanning tree manager 105.

The sliding window 101 defines the scope of the streaming data to be processed, which can be time-based or count based. A time-based sliding window maintains a dynamic graph over a time period, such as an hour or a day, depending on specific applications. A count-based sliding window maintains the most recent W graph updates, where W is the sliding window size. A sliding window is used in various streaming processing systems for accepting continuously incoming data, e.g., new TWEETS, network packets, etc. In an exemplary embodiment of the invention, the sliding window 101 accepts edge additions or deletions in a continuous stream of graph updates, so that the recent state of the underlying graph is captured and the earlier state to be discarded. The edges that fall into the sliding window 101 are passed to the edge sampler and allocator 102 for further processing. The edges that fall outside the window 101 are deleted if they exist in the sampled graph.

The edge sampler and allocator 102 is a system component that receives graph updates from the sliding window 101. The edge sampler and allocator 102 adaptively decides if an edge addition should be accepted or not, based on the current state of the sampled graph. For each accepted edge, the edge sampler and allocator 102 determines to which reservoir manager (e.g., partition manager 103, cluster manager 104, or spanning tree manager 105) the addition/deletion should be allocated.

Figure 2:
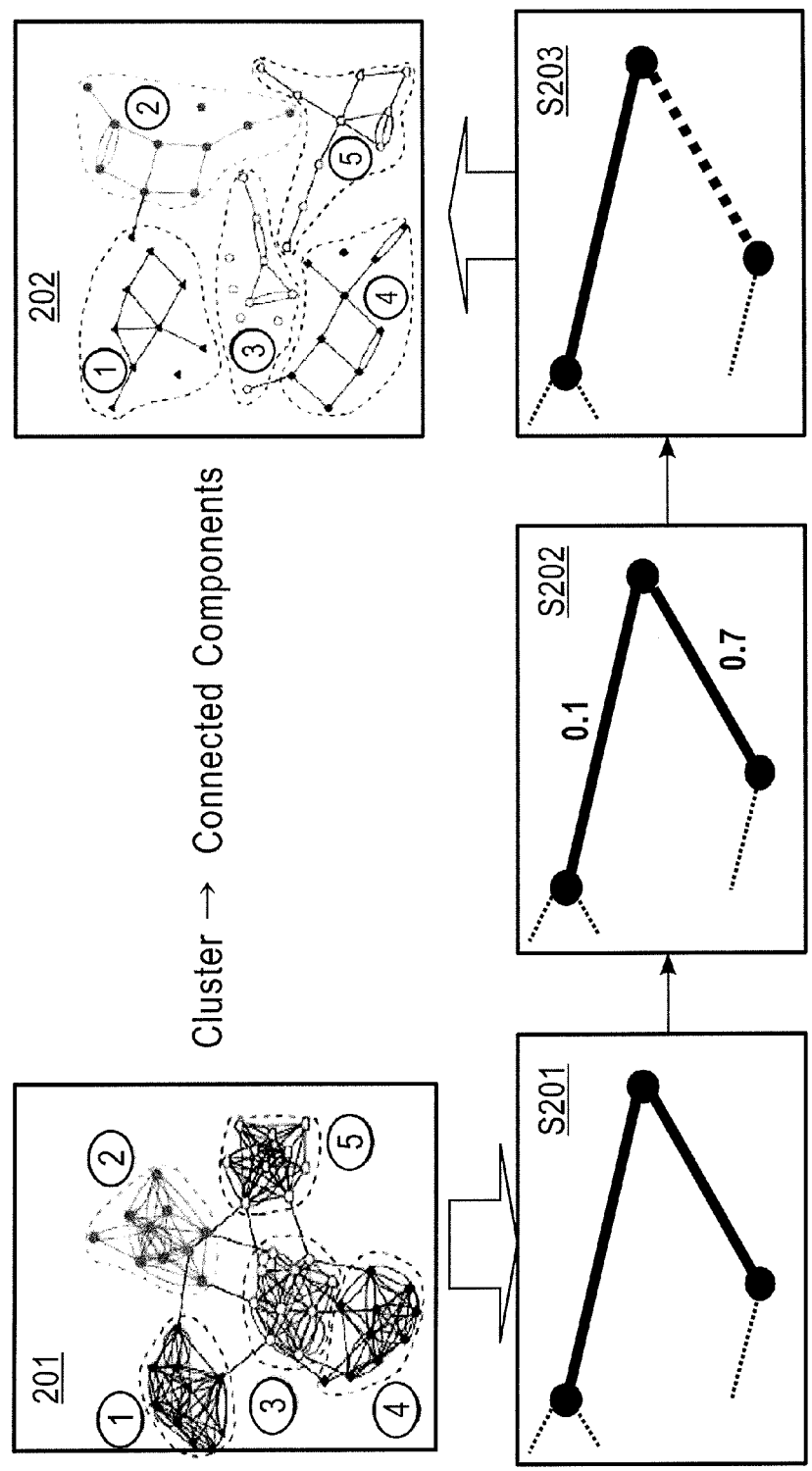
FIG. 2 illustrates an example of the system operating on new incoming edges according to an exemplary embodiment of the invention.

Referring to FIG. 1 and FIG. 2, the edge sampler and allocator 102 can be used to randomly sample a subset of edges in an input graph 201 while keeping the size of each the connected components no larger than the bound B. Each connected component in the sampled graph 201 is viewed as an estimate of a cluster (partition) in the underlying graph. In an exemplary embodiment, this estimation is performed by receiving a graph update including incoming edges (S201) and assigning a random number denoted by r (e.g., in a range [0,1]) to an edge e in each graph update in the sliding window 101 (S202), and only adding the edges with random numbers below a sampling threshold p (S203). For example, FIG. 2 assumes a sampling threshold p is 0.5 and that the upper edge was assigned a random number of 0.1 and the lower edge was assigned a random number of 0.7.

Since the random number of the lower edge is above the sampling threshold of 0.5, it is not added to the resulting graph 202.

Figure 3:
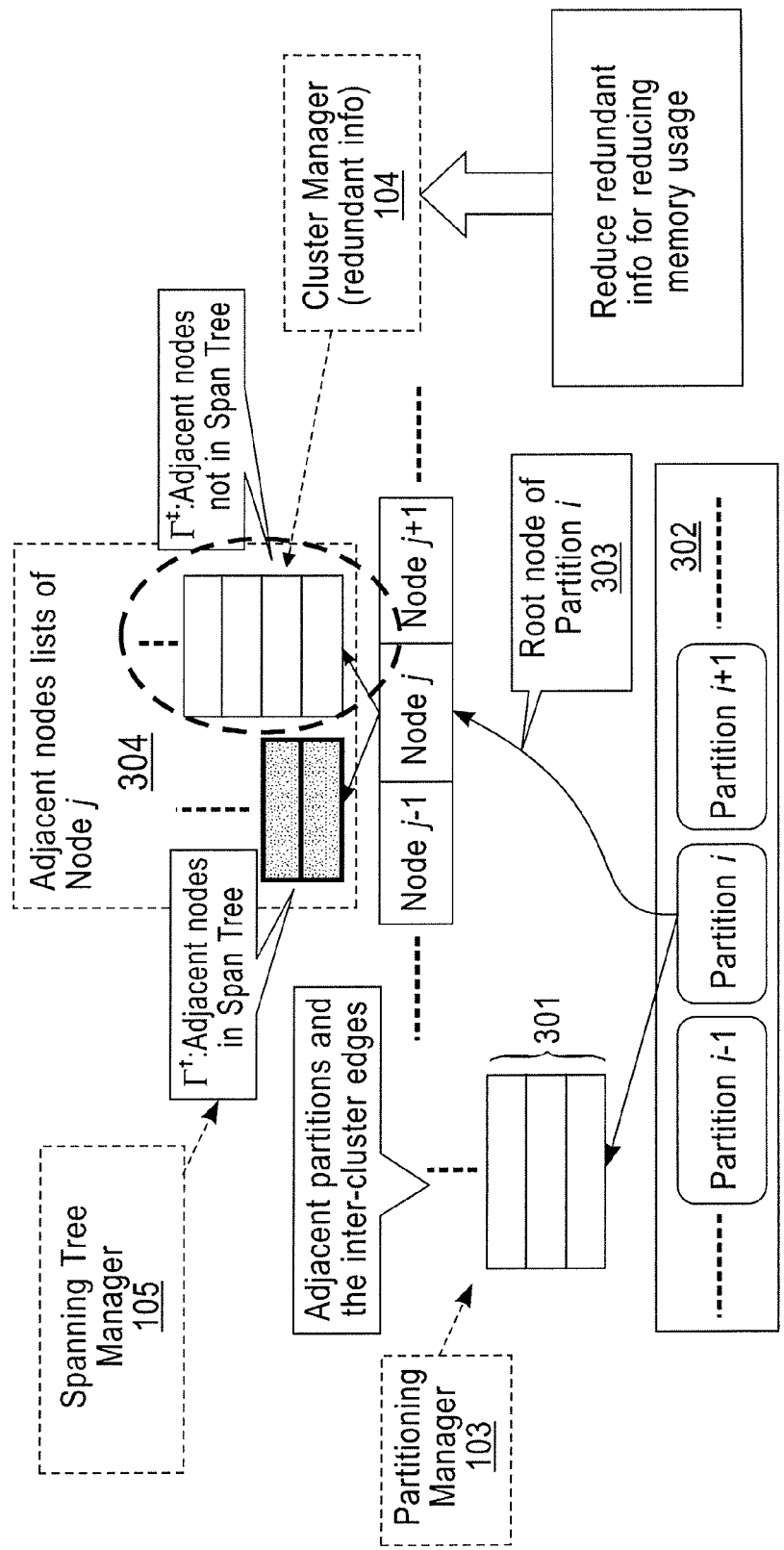
FIG. 3 illustrates an exemplary data structure that is used by the system to managing the clustering according to an exemplary embodiment of the invention.

FIG. 3 shows a structure used by the system to manage clustering. The partition manager 103 tracks partitions (clusters) and the inter-partition edges (edges between clusters) selected by the edge sampler and allocator 102. In an exemplary embodiment, the partition manager 103 maintains a list 301 of elements 302, where each element 302 contains (1) basic information of a partition and (2) information about the inter-partition edges passed by the edge sampler and allocator 102. The basic information of a partition (cluster) may include the partition size (e.g., how many vertices/nodes) and a link 303 to a node in the partition. The partition size is tracked so it can be compared to the given upper bound B. The link 303 to the node (e.g. a root node 107-2) in the partition may be used to traverse the partition. The traversal occurs when a user queries the nodes in a given partition or when creating the spanning tree for a partition. The information about the inter-partition edges passed (e.g., accepted by the edge sampler and allocator 102) indicates whether the corresponding edges are intra-partition edges or inter-partition edges. An intra-partition edge has two inclined nodes in the same partition and an inter-partition edge spans different partitions. The information may also indicate that a node does not exist in any current partition, and this should be treated as a new partition. An inter-partition edge may be equivalent to an edge cut. Since a connected component is viewed in the sampled graph 201 as a partition, inter-partition edges can merge two connected components. To avoid an unnecessary merge, the partition manager 103 tracks the inter-partition edges. When the number of edges between two partitions reaches a certain threshold, the two partitions are merged. In an exemplary embodiment, a merge of two partitions means there were initially two data structures representing each partition, where each data structure included a different cluster identifier, and the merge results in a single data structure with a single cluster identifier.

According to an exemplary embodiment of the invention, the cluster manager 104 maintains the sampled intra-partition edges (e.g., edges within a given cluster) of the sampled graph 201 in a data structure 304. Given a node in the graph, a hash function may be utilized to map the node to some element in an array. Each element in the array tracks the state of a node, including the owner partition of the node and a link to its adjacent node lists (see the two adjacent node lists in FIG. 3). One of the lists stores the neighbors where the corresponding edges appear in a spanning tree and the rest of the edges are stored in the other list. Since edges within a cluster are generally dense, the second list can be quite long. Such a list can be pruned for the sake of memory efficiency. Given a node v, all the nodes in the same partition can be traversed using the adjacent lists.

The spanning tree manager 105 maintains a subset of the edges managed by the cluster manager 104. As discussed above, each partition has a root node. Starting from the root node, one can traverse the nodes in a partition to result in a spanning tree of the partition. For example, if we traverse a connected component using a breadth first search from node v, then the edges connecting node v and its unvisited neighbors are selected into the spanning tree. For representing the spanning tree efficiently, the adjacent lists are divided for each node into two parts, one for the neighbors in the spanning tree and the other for the rest.

In an exemplary embodiment of the invention, an adaptive sampling threshold is utilized for sampling edges in the sliding window 101 and re-sampling earlier accepted edges. Unlike a sampler with a constant sampling threshold, the adaptive sampler (e.g., 102) does not require knowledge of the underlying graph from users and therefore achieves improved clustering performance for streaming graphs. The adaptive sampler may also resample earlier accepted edges when the sampling threshold was relatively higher, so as to possibly eliminate sampled edges between clusters.

According to an exemplary embodiment of the inventive concept, the principle for adjusting the sampling threshold is as follows. For example, if the sizes of most partitions are much smaller than the given upper bound of the cluster size denoted by B, then the sampling threshold p is increased by a first amount so that relatively more edges can be accepted by the sampler. This results in the merge of small partitions. Similarly, if the sizes of most partitions are close to the given upper bound B, the sampling threshold p is reduced a second amount so that the edges between two clusters are less likely to be sampled. The first and second amounts may differ from one another or be the same as one another. These amounts may be based on a metric that is discussed below.

For convenience of discussion, it is assumed that F=F(C, B) is a metric that represents the gap (difference) between the sizes of the current partitions and the given upper bound of the cluster size B, where C is the set of current partitions. This metric may be referred to as a capacity gap of partition sizes. The parameter F can be implemented in various ways, such as the difference between the average size of the current partitions and the upper bound B, the ratio of the median size of the current partitions over B, or any domain-specific metric.

In an exemplary embodiment of the invention, the average size of current partitions for F(C,B) is represented by equation 2 as follows:

$$\mathcal{F}(C, B) = \frac{B - \frac{1}{N}\sum_i |C_i|}{B} \quad (2)$$

where N is the number of clusters and $|C_i|$ is the current size of cluster i.

In an exemplary embodiment of the inventive concept, given a specific metric F(C,B), the adaptive sampling threshold is determined using equation 3 as follows:

$$p = 1 - \exp\{-\mathcal{F}(C, B)\} \quad (3)$$

where one maps the gap measured by F(C,B) into a sampling probability (threshold) between [0,1] using a negative exponential function. Since a higher threshold is expected when many clusters are much smaller than B and a lower threshold when their sizes are close to B, the exponentiated metric is subtracted from 1. However, the metric is not limited to Equation 3 and may vary in other embodiments.

The metric F(C,B) of FIG. 3 theoretically can reach 0 when the sizes of all the clusters reach the upper bound B exactly. However, such a scenario is rarely observed. Thus, the maximum sampling threshold $p_{max}$ is typically lower than 1, and in many cases it is far below 1 due to the unbalanced cluster sizes. To ensure that the sampling threshold p always remains a very low value, F(C,B) can be compensated. In this example, the minimum gap (i.e., Fmin=minF(C,B) is used so that the threshold can vary between [0,1]. Thus, one can map F(C,B) to a probability as follows: $p = 1 - e^{-(F+Fmin)} = 1 - e^{-F}e^{-Fmin}$. Note that Fmin leads to $p_{max} = 1 - e^{-Fmin}$ according to equation 3. Since Fmin is unknown due to the dynamic nature, one can use the current maximum sampling threshold $\hat{p}$ as an estimator to result an adaptive threshold shown by equation 4 as follows:

$$p = \min\left(-\exp\left\{\left(B - \frac{\sum_i |C_i|}{N}\right) \cdot \frac{\log(1 - \hat{p}_{max})}{B}\right\}, 1\right) \quad (4)$$

The adaptive threshold in Equation 4 reaches its maximum when no cluster exists, that is, no edge has been added. In this case, it is reasonable to accept any incoming edges for creating initial clusters. The minimum threshold is achieved when the size of each cluster is exactly equal to B. However, due to imbalanced cluster sizes in practice, $$p = \min\left(-\exp\left\{-\frac{\tilde{p}\left(B - \frac{1}{N}\sum_i |C_i|\right)}{B} + \frac{\tilde{p} \cdot \Delta}{B} - \frac{\tilde{p} \cdot \Delta}{B}\right\}, 1\right) \quad (5)$$

$$= \min((1 - \alpha) + \alpha \cdot (1 - \exp\{-\tilde{p} \cdot \hat{\mathcal{F}}(C, B)\}), 1)$$

where $\tilde{p} = -\log(1 - \hat{p}max)$, $\alpha = \exp\{-\tilde{p} \cdot \Delta/B\}$, and $\hat{F}(C, B) = 1 - \exp\{-\tilde{p}(B - \frac{1}{N}\sum_i |C_i| - \Delta)/B\}$.

Therefore, the adaptive threshold in equation 4 can be rewritten as equation 5 as follows:

$$\Delta = B - \frac{1}{N}\sum_i |C_i| > 0.$$

Given $\Delta > 0$, $\alpha$ can be viewed as damping factor that implies the minimum threshold. A user-defined damping factor can be used in case the clusters are perfectly balanced, even though its occurrence may be rare.

As discussed above, a high sampling threshold p leads to a rapid increase of partition sizes, but it also results in more edges between clusters in the sampled graph. In an exemplary embodiment of the invention, a re-sampling method is used eliminate the edges between clusters from the sampled graph, so that the clusters can be approximated more accurately with the connected components in the sampled graph. The re-sampling method works as follows. When an edge addition from the sliding window 101 is accepted by the edge sampler and allocator 102 at time 1, the edge e=(u, v) is stored along with the current sampling threshold denoted by $p_t$. This may result in storage of many sets of pairs like $(e, p_t)$ in the system. At another time t'>t, an earlier accepted edge is randomly chosen, say edge e accepted at time t. If $p_t > p_{t'}$, then the edge e is re-sampled with the modified sampling threshold p*, which is given by equation 6 as follows:

$$p^* = \frac{p_{t'}}{p_t} \quad (6)$$

For example, assume the current sampling threshold at time 1 (e.g., $p_1$) at which a first edge was accepted was 0.6 (e.g., $p_t$=0.6). Next assume this first edge is the edge that is randomly chosen at time 2 when the sampling threshold is 0.5 (e.g., $p_{t'}$=0.5). Since here $p_t$=0.6 is greater than $p_{t'}$=0.5, the first edge is resampled with a modified sampling threshold p*=0.5/0.6=0.833 and a new random number r that is between 0 and 1 is generated. If the random number r is less than p*, the resampled edge e is retained; otherwise the resampled edge e is deleted from the sampled graph. For example, if the random number r ended up being 0.7, the first edge would be deleted, but if the random number r ended up being 0.9, the first edge would have been retained. Note that the probability that a resampled edge e is retained becomes $\tilde{p}=p_t \times p^* = p_t \cdot p_{t'}/p_t = p_{t'}$, which is the current sampling threshold $p_{t'}$ that is lower than the original threshold $p_t$.

To efficiently pick earlier accepted edges with sampling thresholds higher than the current sampling thresholds, one or more lists (buckets) can be maintained, where each list corresponds to a particular sampling threshold range (e.g., [0.8, 0.9], etc.) and each list includes the accepted edges and their corresponding sampling threshold that fits within the corresponding range. For example, the list with range [0.8, 0.9] could include links to accepted edges with thresholds of 0.81, 0.82, 0.84, etc. Then, when it is time to select an accepted edge with a threshold greater than say a current sampling threshold of 0.79, one of the links can be selected randomly (e.g., the link to the accepted edge with threshold 0.82).

Since the assumption of clustering a streaming graph is to use connected components in the sampled graph to represent a partition (cluster), the edges between clusters can significantly impact the quality of the clustering results. Once a single edge between two clusters appears in the sampled graph, the connected components corresponding to the two clusters merge into a single connected component. An inter-partition edge accepted by the edge sampler and allocator 102 may adversely affect the clustering results. Although the re-sampling method discussed above can statistically mitigate the negative impact of such edges, it cannot prevent the insertion of such edges into the sampled graph. Therefore, in an exemplary embodiment of the invention, a heuristic called confidence accumulation is used to further reduce the potential negative impact of those edges. This accumulation assumes that the changes in the graph from a first time t to a later time t+1 are relatively modest. In an exemplary embodiment of the invention, the current state (i.e., the current partitions) is used to judge if a newly arrived edge is between two partitions or not.

The confidence accumulation heuristic withholds edge additions between two connected components, unless the connection between them is strong enough. The edges between two partitions are kept based on the current state of the sampled graph. Since the current partitions in the sampled graph may belong to the same cluster in the resulting graph and they will eventually merge, such edges are referred to as the speculative inter-partition edges. When a speculative inter-partition edge is added to the partition manager 103, the confidence to merge the two partition increases. The two partitions are merged once the confidence is accumulated (increased) to a certain amount. Merging means that one consolidates the elements corresponding to the partitions in the partition manager 103 and adds all the speculative inter-partition edges between the two partitions, so that they become a single connected component. For convenience of discussion, it is assumed that $\Pi c_i, c_j$ denotes the set of speculative inter-partition edges between partitions Ci and Cj. In an exemplary embodiment of the invention, the two partitions are merged if the following equation 7 is satisfied:

$$|\Pi_{c_i,c_j}| > \min(|\Pi_{c_i,c_i}|, |\Pi_{c_j,c_j}|) \qquad (7)$$

where $\Pi_{c_i,c_i}$ and $\Pi_{c_j,c_j}$ are the intra-partition edge sets. The confidence accumulation makes this clustering robust to the edges between clusters.

Use of confidence accumulation is optional. For example, when confidence accumulation is not used, an edge is added regardless of whether it is an intra-partition or inter-partition edge.

The following is an example of using confidence accumulation to determine whether to add one or more incoming edges. In this example, it is assumed that first and second edges have been received that could potentially merge a first and second cluster (i.e., they connect to both clusters), a confidence accumulation calculation has been performed each time, and as of yet, the result of the calculation is not strong enough to indicate that these clusters should be merged. Assume further in this example, that a third edge that could potentially merge the first and second clusters is received, and the confidence accumulation calculation now indicates that the clusters should be merged. In an exemplary embodiment, all three edges are added between the clusters and the clusters are merged into a single cluster.

A clustering method according to an exemplary embodiment of the invention includes procedures for adding an edge, deleting an edge, merging partitions, and creating a spanning tree. In these procedures, the overall partitions (disjoint clusters) in the sampled graph is denoted by a set $C=\{C_i\}$, where Cdi is also a set representing a partition (i.e., a connected component in the sampled graph). The parameter $C_i=\{u\}$ consists of a set of nodes in the sampled graph. Given a node u, the parameter $\Gamma_u = \Gamma_u^\dagger \cup \Gamma_u^\ddagger$ denotes the adjacent nodes of u in the sampled graph, where $\Gamma_u^\dagger$ represents the adjacent nodes in the spanning tree and $\Gamma_u^\ddagger$ represents the rest of the adjacent nodes. As discussed above, the edges (u, v), $\forall_v \in \Gamma_u$, are all intra-partition edges. The set of inter-partition edges between two partitions, say $C_i$ and $C_j$ is denoted by $\Pi c_i, c_j = \{e=(u,v)\}$.

FIG. 4 illustrates a procedure for adding an edge according to an exemplary embodiment of the invention. Given an input edge e=(u, v), the procedure finds the owner partition for the two end nodes (see Line 1). If any end node is new, the procedure creates a separate partition for it. In case the input edge e is an intra-partition edge (i.e., u and v are within the same partition) (see Line 2), the procedure adds the edge e to the adjacent node lists of u and v, so that edge e is included in the partition (see Line 3). Otherwise, if edge e is an inter-partition edge, the procedure adds edge e to $\Pi c_i, c_j$ for confidence accumulation (see Line 5). If the confidence is strong enough for consolidating the two partitions, the procedure invokes the partition merge method shown in FIG. 6 (see Line 7). Note that Line 6 of the procedure evaluates Equation 7, where $\delta=\min(|\Pi c_i, c_i|, |\Pi c_j, c_j|)$, and Line 10 of the procedure saves the edge-threshold pair into a sorted bucket for the resampling performed in FIG. 8.

FIG. 5 illustrates a procedure for deleting an edge according to an exemplary embodiment of the invention. Unlike edge addition, no sampling occurs since sampling edges to be deleted does not help clustering. In Line 1 of the procedure, the edge e is deleted if it is an inter-partition edge. In Line 2, the procedure figures out if the edge e to delete is in the spanning tree of the partition. If so, the procedure needs to re-build the spanning tree, since the deletion of such an edge e can possibly split the partition into two connected components (i.e., two separate partitions). Otherwise, the procedure deletes the edge e directly by updating the adjacent lists (see Line 5). After deletion, the edge-threshold pair is also removed from the sorted buckets (see Line 6).

FIG. 6 illustrates a procedure for merging two partitions according to an exemplary embodiment of the invention. To merge partitions $C_j$ and $C_i$, the procedure randomly picks an edge (u, v) from the inter-partition edge set $\Pi c_i$, $c_j$ and inserts this edge to both spanning trees of the two partitions (see Lines 1-3). Therefore, a joint spanning tree is in the sampled graph that represents the merged partition in the input graph. After the partition merge, $C_i$ includes all the nodes previously in $C_i$ or $C_j$. Thus, the owner partition information of these nodes needs to be updated. The rest of the inter-partition edges previously between $C_i$ and $C_j$ are inserted as intra-partition edges of the new $C_i$ (see Lines 4-7). Finally, the procedure removes partition $C_j$ from the reservoirs.

FIG. 7 illustrates a procedure for building a spanning tree according to an exemplary embodiment of the invention. This procedure is invoked only when an edge denoted by e=(u, v) in the spanning tree of a partition, say C, is deleted. Due to such deletion, the partition C can be split into two partitions $C_u$ and $C_v$. Therefore, spanning trees for $C_u$ and $C_v$ are rebuilt by designating u and v as the root nodes for the two partitions, respectively. After deleting edge e=(u, v) in Line 1, the nodes in partition $C_u$ are identified by traversing the partition starting at u (Line 2). During the traversal, the adjacent lists $\Gamma_u^\ddagger$ and $\Gamma_u^\dagger$ are updated for each node in the partition (see Line 4). If partition $C_u$ consists of partial nodes in C, a spanning tree is created for partition $C_v$ consisting of the rest of the nodes (see Lines 6-10).

FIG. 8 illustrates a procedure for clustering streaming graphs according to an exemplary embodiment of the invention, which is based on the procedures of FIGS. 4-7. In Line 1 of the procedure, the partitions are initialized using static schemes. Then, at each time step (t0, t1, . . . ), the graph updates are categorized within the sliding window 101 into two sets $S_{add}$ and $S_{del}$, denoting edge additions and deletions, respectively. Note that edge additions falling out of the sliding window 101 are treated as edge deletions, since these stale edges should be eliminated from the sampled graph. In Lines 4-8 of the procedure, the edge deletion procedure of FIG. 5 is invoked to eliminate edges in $S_{del}$. Then, in Lines 9-20 of the procedure, the edge addition procedure of FIG. 4 is applied. The adaptive sampling threshold p is updated according to Equation 5 in Line 10. If e∈$S_{add}$ is accepted by the edge sampler and allocator 102 (see Line 11), the procedure invokes the edge addition procedure (see FIG. 4) to process the edge e based on the current state of the sampled graph. The intra-partition edges are added directly; while inter-partition edges are used for confidence accumulation. After the edge addition, the resampling is performed in Lines 13-17.

The complexity of processing a graph update by the procedure of FIG. 8 is only related to the size of a partition B, rather than the number of partitions or the total number of nodes/edges in the graph. Given a moderate upper bound of partition size B, the procedure is efficient to handle large-scale and highly dynamic graphs. This characteristic makes this embodiment and the other embodiments discussed above especially suitable for handling social media (e.g., FACEBOOK, TWITTER, etc.) analytics, where the underlying graphs are typically very large and highly dynamic.

Figure 9:
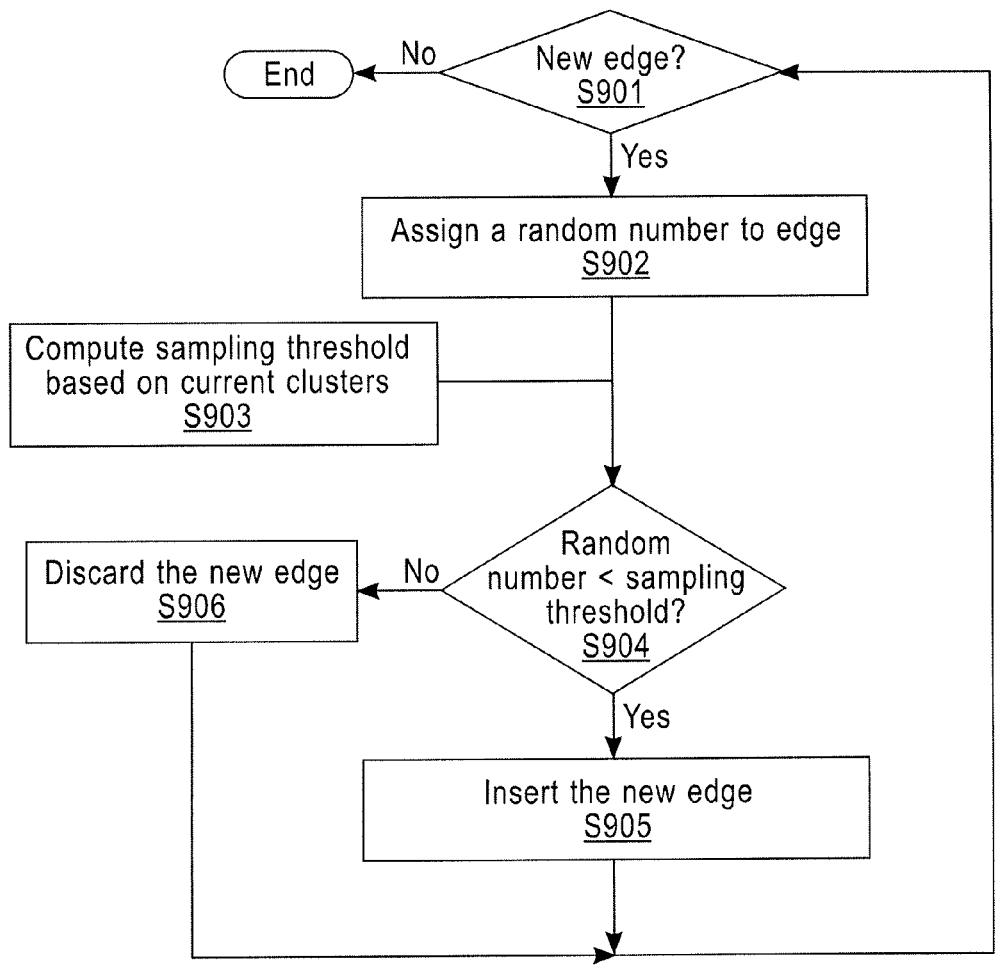
FIG. 9 illustrates a high-level flow chart of a method of clustering a streaming graph according to an exemplary embodiment of the invention.

FIG. 9 illustrates a high-level flow chart of a method of clustering a streaming graph according to at least one of the above-described embodiments. The method includes determining whether a new incoming edge has been received (S901). For example, the new incoming edge could be a new TWEET from one user to a second user. The method then includes assigning a random number r to the edge (S902) and computing a sampling threshold p based on the current clusters. The assignment of the random number may occur after or at the same time the sampling threshold p is computed. For example, during a previous period several TWEETS may have occurred among a group of users and been captured in a streaming graph, which could include one or more clusters. For example, if one set of the users is currently TWEETING about sports and the remaining users are currently TWEETING about cooking, the streaming graph could be divided into a first cluster of the first set of users and a second cluster of the second users. The method next determines whether the random number r is less than the sampling threshold p (S904). If it is determined that the random number r is less than the sampling threshold p, the new edge is added to the graph (S905), otherwise the new edge is discarded (S906). The method can be repeated multiple times for each newly received edge. For example, the next time one of the users TWEETS, the method can be applied to the new TWEET. The above method can be modified further to only add the edge based on certain conditions. For example, if the edge to add is an intra-partition edge it can be added directly, but if it is an inter-partition edge, its addition can be delayed until it is determined to be a strong connection.

While the above example is discussed with respect TWITTER TWEETS, embodiments of the invention are not limited thereto. For example, embodiments of the invention may be applied to any application that receives a continuous stream of messages that could be used to build a streaming graph.

Figure 10:
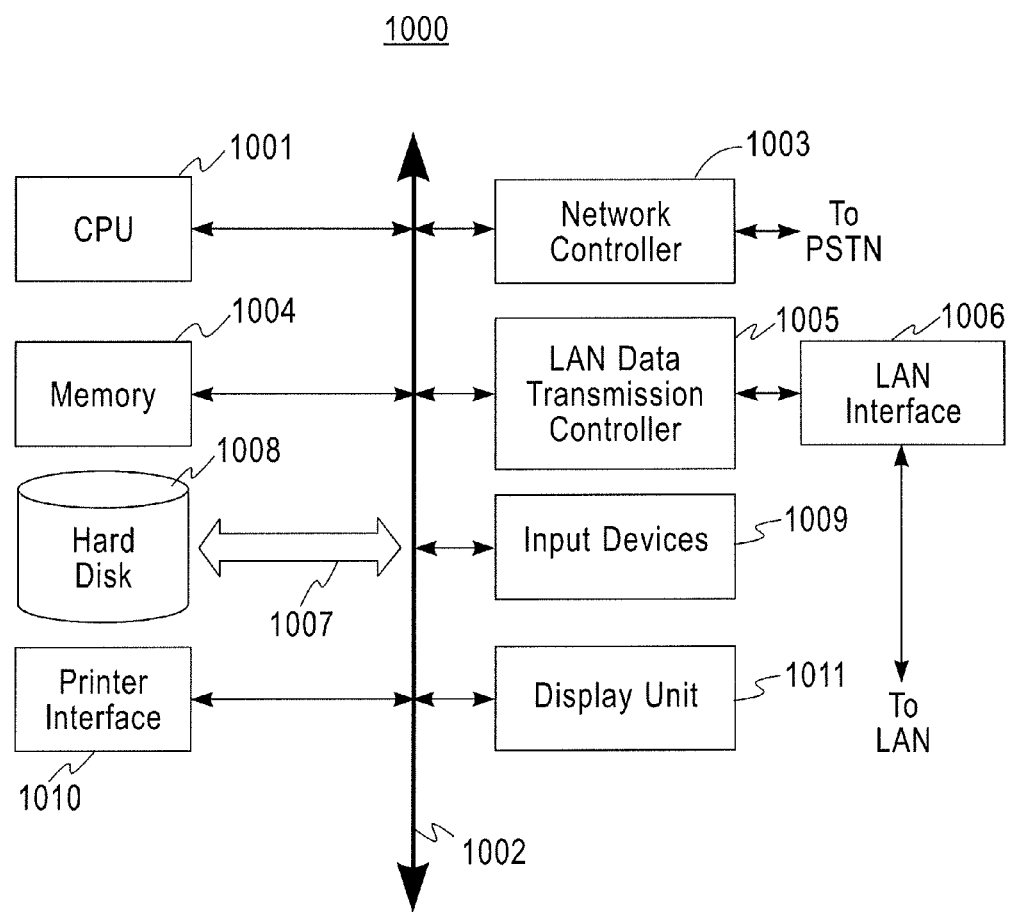
FIG. 10 illustrates an example of a computer system capable of implementing methods and systems according to embodiments of the disclosure.

FIG. 10 illustrates an example of a computer system, which may execute any of the above-described methods, according to exemplary embodiments of the invention. For example, the managers of FIG. 1, procedures of FIGS. 4-8 and the method of FIG. 9 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for clustering a streaming graph, the method comprising:
    assigning, by a processor, a random number to an incoming edge that is to be assigned to a cluster among a plurality of clusters comprising edges representing computer messages previously exchanged between users across a computer network;
    adjusting, by the processor, a value of a sampling threshold based on the current clusters;
    inserting, by the processor, the incoming edge into the current clusters if, the random number is less than the sampling threshold; and
    discarding, by the processor, the incoming edge if the random number is not less than the sampling threshold,
    wherein the adjusting of the value comprises:
        decreasing the value when sizes of most of the clusters is between a threshold and an upper bound; and
        increasing the value when the sizes of most of the clusters is below the threshold,
        wherein the upper bound is a limit on the number of vertices allowed in each cluster.

2. The method of claim 1, wherein prior to the assigning, the method comprises:
    maintaining a structure for each cluster indicating connections between nodes within the corresponding cluster; and
    maintaining edges for each pair of the clusters that connect a node within a first cluster of the pair to a node within the second cluster of the pair.

3. The method of claim 2, further comprises:
    maintaining a spanning tree for a corresponding cluster that corresponds to part of the vertices of the cluster; and maintaining the remaining vertices of the corresponding cluster not included in the tree.

4. The method of claim 1, wherein the inserting of the incoming edge comprises:
identifying cluster identifiers (IDs) of the clusters corresponding to two vertices of the incoming edge; and
merging two clusters corresponding to the cluster IDs when the cluster IDs are different and a number edges between the two clusters exceeds a pre-defined number.

5. The method of claim 1, further comprises:
computing a new random number when a given edge of the existing clusters was previously sampled using a previous sampling threshold greater than the computed sampling threshold; and
performing one of removing or retaining of the given edge based on the random number.

6. The method of claim 5, wherein the performing comprises:
determining a divided value by dividing the computed sampling threshold by the previous sampling threshold;
retaining the given edge when the new random number is less than the divided value; and
deleting the given edge when the new random number is not less than the divided value.

7. The method of claim 1, wherein the clusters are derived from social media data and the incoming edge represents a new computer message exchanged between a first user and a second user among the users.

8. The method of claim 1, where the incoming edge is received as a result of applying a sliding window to a plurality of incoming edges, the sliding window defining a scope of data to be processed.

9. A system to manage clustering a streaming graph, the system comprising:
a memory comprising a computer program and a data structure storing a plurality of clusters comprising edges representing computer messages previously exchanged between users across a computer network; and
a processor configured to execute the program to adjust the clusters in response to an incoming edge by assigning a random number to the edge, adjusting a value of a sampling threshold based on the current clusters, and adjusting the current clusters based on the random number and the sampling threshold;
wherein the adjusting of the value comprises:
decreasing the value when sizes of most of the clusters is between a threshold and an upper bound; and
increasing the value when the sizes of most of the clusters is below the threshold,
wherein the upper bound is a limit on the number of vertices allowed in each cluster,
wherein the data structure maintains a structure for each cluster indicating connections between nodes within the corresponding cluster and edges for each pair of the clusters that connect a node within a first cluster of the pair to a node within the second cluster of the pair.

10. The system of claim 9, wherein the data structure further maintains a spanning tree for a corresponding cluster that corresponds to part of the vertices of the cluster and the remaining vertices of the corresponding cluster not included in the tree.

11. The system of claim 9, wherein the program adjusts the clusters by inserting the incoming edge into the current clusters if the random number is less than the sampling threshold and discarding the incoming edge if the random number is not less than the sampling threshold.

12. The system of claim 11, wherein the program inserts the incoming edge by identifying cluster identifiers (IDs) of the clusters corresponding to two vertices of the incoming edge and merging two clusters corresponding to the IDs when the cluster IDs are different and a number of edges between the two clusters exceeds a predetermined number.

13. The system of claim 9, wherein the program computes a new random number when a given edge of the existing clusters was previously sampled using a previous sampling threshold greater than the computed sampling threshold and performs one of removing or retaining of the given edge based on the random number.

14. The system of claim 13, wherein the program determines a divided value by dividing the computed sampling threshold by the previous sampling threshold, retains the given edge when the new random number is less than the divided value, and deletes the given edge when the new random number is not less than the divided value.

15. The system of claim 9, wherein the clusters are derived from social media data, and the incoming edge represents a new computer message exchanged between a first user and a second user among the users.

16. The system of claim 9, where the incoming edge is received as a result of applying a sliding window to a plurality of incoming edges, the sliding window defining a scope of data to be processed.

17. A method for clustering vertices of a streaming graph, the method comprising:
assigning, by a processor, a random number to an incoming edge;
changing, by a processor, a sampling threshold based on how sizes of a majority of existing clusters of the graph compare to a threshold;
inserting, by the processor, the incoming edge into the existing clusters if the random number is less than the sampling threshold; and
discarding, by the processor, the incoming edge if the random number is not less than the sampling threshold,
wherein the existing clusters comprise edges representing computer messages previously exchanged between users across a computer network,
wherein the clusters are derived from social media data, and the incoming edge represents a new computer message exchanged between a first user and a second user among the user.

18. The method of claim 17, further comprises:
computing a new random number when a given edge of the existing clusters was previously sampled using a previous sampling threshold greater than the computed sampling threshold; and
performing one of removing or retaining of the given edge based on the random number.

19. The method of claim 17, wherein the inserting of the incoming edge comprises:
identifying cluster identifiers (IDs) of the clusters corresponding to two vertices of the incoming edge; and
merging two clusters corresponding to the cluster IDs when the cluster IDs are different and a number of between the two clusters exceeds a threshold.

20. The method of claim 17, wherein the changing comprises:
decreasing the sampling threshold when the sizes are greater than the threshold; and
increasing the sampling threshold when the sizes is less than the threshold.

21. The method of claim 17, where the incoming edge is received as a result of applying a sliding window to a plurality of incoming edges, the sliding window defining a scope of data to be processed.

* * * * *